Figure 1:
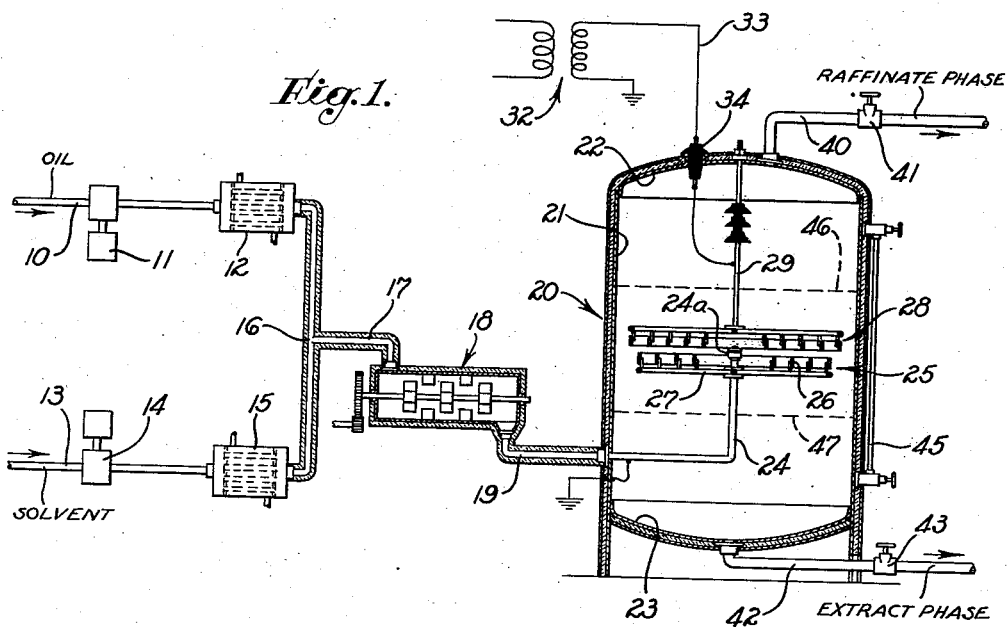

Feb. 19, 1946.  R. B. PERKINS, JR  2,395,011
ELECTRIC SOLVENT-REFINING OF PETROLEUM
Filed Nov. 10, 1939

INVENTOR
RODERICK B. PERKINS, Jr.
BY
HARRIS, KIECH, FOSTER & HARRIS

FOR THE FIRM

ATTORNEYS

Patented Feb. 19, 1946

2,395,011

UNITED STATES PATENT OFFICE 2,395,011

ELECTRIC SOLVENT-REFINING OF PETROLEUM

Roderick B. Perkins, Jr., Houston, Tex., assignor to Petrolite Corporation, Ltd., Wilmington, Del., a corporation of Delaware Application November 10, 1939, Serial No. 303,841

10 Claims. (Cl. 204—190)

This invention relates to the treatment of oils and, more particularly, to refining of oils by the action of a partially miscible liquid such as a selective solvent.

Various methods for the refining of oils by selective solvents are known in which the oil is commingled with a selective solvent adapted to form with the oil two conjugate phases; one phase, namely the extract phase, being relatively rich in the undesirable constituents of the oil, and the other phase, the raffinate phase, being relatively rich in the desirable constituents of the oil. With regard to petroleum oils, the more aromatic and naphthenic hydrocarbons are usually regarded as undesirable and the paraffin or paraffin-like hydrocarbons are regarded as desirable.

Selective solvents having the property of forming with petroleum oil conjugate phases, one of which is relatively rich in aromatic and naphthenic hydrocarbons, and the other of which is relatively rich in paraffin hydrocarbons, are sulphur dioxide, phenols, dichlorethyl ether, furfural, nitrobenzene, cresylic acid, chloraniline, crotonaldehyde, acrolein, aniline oil, and the like. Modifying agents may be used in connection with these solvents to increase the solvent power of the solvent (for example, the modifying agent benzol may be added to sulphur dioxide to increase its solvent power), or to either decrease the solvent power or increase the selectivity (for example, a small amount of sulphuric acid may be used in this connection with basic materials, such as aniline, or a small amount of ammonia may be used in connection with acidic materials, such as cresylic acid and phenol). In addition, secondary solvents may be used, such as propane, which remain largely with the raffinite phase and serve to increase the sharpness of separation.

The separation obtained in a single extraction is not sharp inasmuch as substantial proportions of the paraffin hydrocarbons are dissolved in the extract phase and substantial proportions of the aromatic and naphthenic hydrocarbons are dissolved in the raffinate phase. In order to increase the sharpness of the selectivity of the process, it is usually found necessary to have recourse to multiple extractions, either in the form of a countercurrent extraction tower or a multi-stage countercurrent extraction apparatus.

The selectivity of a solvent process or the yield of a desired product obtained from such a process is very seriously diminished when there is any substantial entrainment during any separatory stage of either raffinate phase in the extract or extract phase in the raffinate.

It is, accordingly, an object of the present invention to increase the selectivity and yields obtained in solvent refining by preventing entrainment during the separation of conjugate phases.

One of the factors promoting entrainment is the necessity for obtaining intimate contact between the solvent and oil during the extraction period. Such contact is normally obtained by vigorous agitation of the two liquids. This results in the formation of numerous small droplets of both phases and, when such a mixture is allowed to stand, even after the bulk of the extract and raffinate phases has separated, there is still a substantial quantity of small droplets of the extract phase dispersed in the raffinite phase and, similarly, a substantial quantity of small droplets of the raffinate phase dispersed in the extract phase. To insure the complete settling of such droplets into their proper phase, a very long period of settling is required.

The necessity of providing for long periods of settling in each separatory stage serves to decrease the throughput of a given plant and also necessitates the construction of large settling vessels in which much of the material being treated is held up at any given time.

It is, accordingly, an object of the present invention to provide a rapid and efficient method for the separation of conjugate phases obtained in the solvent extraction of oils.

Frequently, difficulties of a more severe nature are encountered such that proper separation is not obtained even after prolonged settling. This is particularly true in the case of untreated lubricating oil distillates, or of undistilled long residuums. Such unrefined materials apparently contain asphaltic or other constituents which are effective as emulsifying agents and tend to stabilize any dispersion that is formed. Frequently, in such instances, not only is the dispersion of the fine particles stabilized but there also appears at the interface between the two phase layers a zone of somewhat coarse but relatively stable emulsion.

Such a zone of interfacial emulsion may continue to grow until the position of the interface is no longer ascertainable either by visual or mechanical methods. Under such circumstances, it is impossible to properly adjust the relative draw-offs of the raffinate and extract phases and, in the absence of such adjustment, one of the phases is frequently drawn off more rapidly than it forms, whereby substantial proportions of the conjugate phase are soon drawn off with it.

In still other circumstances, the zone may grow to such a degree that it fills substantially all of the separating chamber and discharges through both the extract and raffinate draw-off means.

It is, accordingly, an object of the present invention to provide a means for separating conjugate phases formed during solvent refining, whereby such phases can be completely and cleanly separated even in the presence of emulsifying agents tending to stabilize dispersions and/or interfacial emulsions.

Frequently, rejection steps are used in a solvent refining process wherein a separated phase, usually an extract phase, is cooled, diluted, or otherwise treated to form a small quantity of a new conjugate liquid phase which is then separately withdrawn from the bulk of the remaining phase. Such a method is frequently used to recover an intermediate grade oil from a primary extract fraction. The settling time required in such a rejection step is usually very prolonged due to the fact that the new phase is produced as a cloud of very minute particles, as, for instance, when the temperature is reduced, which small particles have naturally a very low settling rate, and the settling rate may be further decreased due to the fact that at the lowered temperature the increased viscosity of the phases also tends to decrease the rate of settling and coalescence of the particles to a separate liquid phase.

It is, accordingly, an object of the present invention to rapidly and efficiently separate conjugate liquid phases obtained from a homogeneous phase by cooling or other treatment adapted to cause the desired phase separation.

I have discovered that the above objects can be obtained by subjecting the mixture of extract and raffinate phases, either prior to settling or after partial separation, to the action of an electric field, preferably a high-voltage alternating field. Under the action of such a field, I have found that the dispersed particles coalesce to form larger masses which rapidly respond to gravitational settling.

I have also discovered that the action of an electric field tends to mitigate or destroy the stabilizing effect of emulsifying agents, such as small amounts of asphaltic or other similar materials, so that by my process, I am able to solvent refine stocks which have hitherto been regarded as impossible to treat without a preliminary refining step.

In its simplest form, my process consists in contacting and/or agitating the oil with a selective solvent, discharging the dispersed mixture into a high-voltage field, preferably alternating in character, settling the treated emulsion, and separately withdrawing the conjugate phases. Alternatively, I may allow the dispersed mixture to separate partially and then treat one or both of the partially resolved phases to separate entrained droplets of the conjugate phase.

The electrodes may be positioned, if desired, in the settling chamber and may be supplemented, if desired, by auxiliary treating electrodes both above and below the main treating electrodes and positioned in the raffinate and extract phases respectively.

Figure 2:
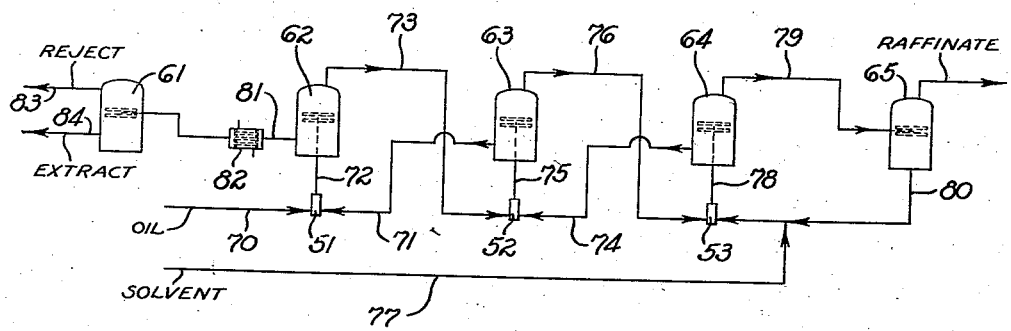

Further objects and aspects of my invention will become apparent from the following discussion relative to the drawing, in which:

Figure 1 illustrates one embodiment of my invention as applied to a single-stage solvent extraction process; and Figure 2 is a schematic diagram of a multistage countercurrent extraction process employing electric separation in accordance with my invention.

Referring more particularly to Figure 1, the oil which it is desired to treat, such as an unrefined lubricating oil stock, is brought through a transfer pipe 10 by means of a pump 11 and brought to a suitable temperature for solvent refining by means of a heat exchanger 12. The desired solvent, for example nitrobenzene, is passed through a transfer line 13 by means of a pump 14 adjusted, relative to pump 11, to give the proper solvent-oil ratio, and the solvent may likewise be heated or chilled in a heat exchanger 15. The flowing streams of oil and solvent are mingled at a juncture 16 and passed by means of a pipe 17 to an agitating device 18 in which the mixture is agitated for a sufficient period of time to permit the conjugate phases to come to equilibrium at the temperature employed.

As a result of the agitation, the mixture removed from the mixing device 18 may constitute a dispersion of raffinate phase in extract phase, or extract phase in raffinate phase, or both, and, in general, represents a more or less complex dispersion requiring a substantial or even a prolonged settling period for its resolution and separation by gravitational action.

This dispersion is conducted by means of a pipe 19 to an electric treater 20. Such an electric treater is essentially a device for subjecting the dispersion to the action of an electric field adapted to induce coalescence of the disperse phases. Various types of electrode structures may be used to define the field, and such electrodes may be energized by either alternating or direct current, although I find the former more convenient and usually more advantageous to use.

Such a treater should comprise means for suitably introducing the unresolved emulsion or dispersion into the field zone and should also comprise means for subjecting the treated dispersion after issuance from the field to a zone of more or less quiescent settling, which settling zone may be constituted by the treater vessel itself or, if desired, by a separate settling vessel.

These general requirements of an electric treater are suitably provided for in the indicated structure of treater 20. This treater comprises a cylindrical shell 21 closed at top and bottom by heads 22 and 23, respectively. The closed container thus constructed is of sufficient size to permit on-stream settling of the electrically treated emulsion in the treater itself so that raffinate and extract phases may be continuously withdrawn from the upper and lower portions of the treater.

The transfer pipe 19 is connected through the walls of the cylindrical shell 21 to an internal pipe 24 which has a vertical extension located more or less centrally with respect to the shell and which terminates in a spring-loaded distributor 24a adapted to discharge the emulsion in the form of a flat sheet moving radially outward in all horizontal directions from the distributor. Symmetrically mounted at the end of pipe 24 is an electrode structure 25 comprising a series of concentric rings 26 supported by rods 27 which are electrically and mechanically connected to pipe 24.

A companion electrode structure 28, likewise consisting of a series of concentric rings, is supported a short distance above the electrode 25 by means of an insulated rod 29 supported from the top head 22.

The electrode 28 may be energized by means of a transformer 32 situated outside of the treater and electrically connected to electrode 28 by means of a conductor 33 which is passed through the top head 22 by means of an insulating bushing 34. One terminal of the transformer, as well as the treater shell and pipe 24, is grounded, and the electrode 25, which is electrically connected to pipe 24, remains at ground potential.

When the primary of transformer 32 is connected to a suitable source of alternating current, an electric field is set up between the electrodes 25 and 28. The gradient in this field is not uniform throughout the whole field due to the discontinuous structure of the electrodes. I find that the use of such a non-uniform field is sometimes advantageous, particularly the field as produced by the staggered relationship of the upper and lower sets of concentric rings, as indicated.

The applied average gradient as determined by the potential employed and the electrode spacing used will vary according to the materials being treated, temperature of treatment, and the like, but in general will be relatively high, suitably 5,000 to 10,000 volts per inch, or even higher, for example, 20,000 volts per inch.

Treater 20 is provided with an upper draw-off line 40 having a valve 41 and a lower draw-off line 42 having a valve 43. The lighter phase thus drawn off at the top of the treater will in the case of most solvents be the raffinate phase and the lower more dense phase withdrawn through the lower draw-off line 42 will be the corresponding extract phase. These phases are normally drawn off in production ratio in order to keep a constant interfacial level in the treater 20. In order to determine the position of the interface in the treater 20, the latter may be provided with some indicating device, for example a sight glass 45. The interface may be kept either above the electrode structures as indicated by the dotted line 46, or below the electrode structures as indicated by the dotted line 47. In general it is advantageous to maintain the interface at such a level that the electrodes are situated in the phase of greatest resistivity, usually the raffinate phase.

In practice the treater 20 is preferably well insulated with a heat insulating jacket or coating in order to prevent any substantial temperature change during electrical treatment which might affect the equilibrium between the conjugate phases.

The operation of the treater 20 is substantially as follows. The dispersion conducted to the field by means of pipe 24 is a complex dispersion comprising droplets of raffinate phase in extract phase, or vice versa, or both. These phases will normally differ in their electrical characteristics, such as their dielectric constants, dielectric strengths, resistivities, and the like. These differences in electrical characteristics make possible the successful resolution of the dispersion by the action of electric fields. Droplets of high dielectric constant are attracted to regions of high gradient in the field such as may be produced by the electrode structure itself, or by induced charges on other droplets. Droplets of low dielectric constant, on the other hand, tend to accumulate in those portions of the field in which the gradient is weaker. The electric forces thus tend to bring together droplets of like character and to forcibly coalesce them. During the period that the dispersion is in the field this coalescence continues to such a degree that any remaining dispersion consists only of relatively coarse droplets formed by the coalescence of a number of originally finer droplets. These coarser droplets rapidly settle or rise in the quiescent portions of the treater so that the separation of the mixture into two homogeneous phases is readily accomplished.

Not only does the electric field induce much more rapid separation of the conjugate phases, but also, due to the absence of any fine dispersion, the interface is maintained substantially free from any accumulation of unresolved emulsion so that its position may be readily determined by means of a float, sight glass, or other suitable means, so that the rates of withdrawal of the raffinate and extract phases may be properly adjusted to maintain the position of the interface approximately constant.

Not only does the electric field forcibly bring the dispersed droplets into contact, but there is also a definite tendency to render the droplets more susceptible to coalescence on contact by various modifications of the interfacial film surrounding the droplets. Such modifications include modification of the interfacial tension, removal of emulsifying agents, and like phenomena which are attributable to the action of the electric field.

While I usually prefer to employ alternating current fields, it is also possible to make use of direct current fields to induce similar phenomena of coalescence and separation. If desired, auxiliary treating fields may also be employed; for example, an auxiliary pair of electrodes may be situated in the upper portion of treater 20 to provide a field through which the raffinate phase rising toward the top of the treater must pass, or an auxiliary pair of electrodes may be situated near the bottom of the treater to provide additional treatment for the extract phase, or both.

The further handling of the raffinate and extract phases thus removed from the electric treater is conventional and will usually include distillation steps for the recovery of the solvent from these phases.

When employed in a multi-stage extraction process, my invention may be used in connection with each separatory stage, or it may be used to separately treat the final extract and/or raffinate phase, or it may be generally employed wherever settling rates are so slow as to make it impossible or impracticable to quickly and rapidly separate the phases by quiescent standing.

Fig. 2 illustrates the use of my electric treater in a three-stage, countercurrent extraction process. Referring more particularly to Fig. 2, the devices indicated by numerals 51, 52, and 53 are mixers, and numerals 61 to 65, inclusive, indicate electric treaters of the kind described in connection with Fig. 1, or any other type of electric treater suitably adapted for the purpose. Oil is introduced into mixer 51 by means of a line 70, and is therein mixed with extract phase from treater 63 conveyed to mixer 51 by means of a pipe 71. The dispersion of conjugate phases formed in mixer 51 is transferred to treater 62 by means of a pipe 72. The mixture is electrically treated in treater 62 and allowed to separate into an upper raffinate and a lower extract phase. The upper raffinate phase is withdrawn through a pipe 73 and is passed to mixer 52 where it is mixed with an extract phase transferred from treater 64 by means of a pipe 74. The resulting mixture of conjugate phases is transferred by means of a pipe 75 to electric treater 63 where it is electrically treated and allowed to separate into an upper raffinate and a lower extract phase. The extract phase is withdrawn as previously indicated and the raffinate phase is transferred by means of a pipe 76 to mixer 53 wherein it is commingled with fresh solvent brought from a suitable source by means of a pipe 77, and the resulting dispersion of conjugate phases is transferred by means of a pipe 78 to treater 64 wherein it is electrically treated and separated into a raffinate and extract phase. The extract phase is handled as previously indicated and the raffinate phase is withdrawn through a pipe 79 and may, if desired, be sent directly to a raffinate recovery still. In instances where there is still some slight amount of entrained extract phase in this final raffinate, it may be very advantageously passed through electric treater 65 wherein the disperse droplets of extract phase are electrically coalesced and allowed to separate as a lower extract phase. This extract phase may be conveniently re-introduced into the system by withdrawing it through a pipe 80 and commingling it with fresh solvent in pipe 77. The indicated use of treater 65 is particularly advantageous when a simple settling vessel is substituted for treater 64 since then the raffinate may carry quite appreciable quantities of entrained extract phase.

The final extract phase is removed from the treater 62 by means of a pipe 81 and may, if desired, be sent directly to a solvent recovery still or it may be subjected to further electric treatment in treater 61. This latter treater is particularly advantageously employed when it is desired to treat the final extract for the recovery of an intermediate grade oil. As an example of such a step, the extract withdrawn through line 81 may be passed through a heat exchanger 82 in which its temperature is lowered sufficiently to cause the rejection of a conjugate phase comprising intermediate grade fractions of oil. This rejected phase initially appears as a fine cloud of droplets dispersed throughout the extract phase. This dispersion is subjected to the action of the electric field in treater 61 whereby rapid separation of the reject and extract phases is induced. The reject phase comprising intermediate grade fractions may be withdrawn from treater 61 by means of a line 83, and the extract phase may be withdrawn therefrom by means of a line 84. The further handling of these phases follows conventional practice and will, for example, normally comprise the separate distillation of these two phases for the recovery of solvent and the production of intermediate and extract grade oil.

For the successful and advantageous practice of my process the following points should be borne in mind.

The electrical properties of importance in this process are the dielectric strength of the dispersion which controls the maximum voltage gradient that can be sustained, the resistivity of the dispersion which controls the current flow at any voltage gradient, and the resistivities and dielectric constants of the extract and raffinate phases taken separately. These last factors control the differential effect of the electric field upon the two phases and determine the ability of the field to produce coalescence and separation of phases. In addition, in cases where a stable interfacial film exists thereby producing a stable emulsion, the effects of the electric field also involve its ability to destabilize the interface precedent to causing coalescence.

In general, the resistivity of solvents normally used for solvent extraction of lubricating oil is high; i. e., of the order of magnitude of crude oil resistivities. The systems treated will thus normally present no undue difficulties in the way of excessive current consumption. In many instances, however, it is preferable to place the treating electrodes in the phase of greatest resistivity in order that this phase may act in part as an insulating barrier for the electrodes. As a rule, the raffinate phase displays the greatest resistivity.

In some instances best results are had by treating a dispersion in which one or the other phase is maintained as an external phase. The selection of one or the other phase as an external phase to give proper conditions for electric treatment may be variously accomplished. For example, the positioning or immersion of the treating electrodes in a give phase tends to make that phase the effective external phase. Also, if desired, a preliminary partial settling step may be employed for the production of the desired dispersion. For example, if it is desired to treat a dispersion having a raffinate phase as the external phase, the conjugate phases may be allowed to partially settle and the upper raffinate continuous phase separately withdrawn and subjected to electric treatment for the removal of the dispersed extract phase. The remaining extract phase from the partial settler may then be treated by further gravitational settling or by electric treatment in a separate electric treater under conditions more favorable for the electric treatment of the extract continuous phase.

The above considerations relating to the identity of the external phase are normally unimportant but may become of importance where one of the phases, for example the extract phase, has been rendered relatively conducting by the addition of a small amount of highly conductive material such as an acid. In the latter instance, it is usually advisable that the extract form the internal phase of the system to be electrically treated.

In some instances the identity of the external phase is of importance as regards the relative dielectric constants of the two phases. For example, in cases where relatively stable interfacial films exist, somewhat better resolution is frequently obtained when the disperse phase has the higher dielectric constant since it is then forced into zones of higher voltage gradient and hence the film material is subjected to greater destabilizing forces.

The most important factor involved in electrical coalescence of the dispersed droplets is the difference in dielectric constant between the extract and raffinate phases. A substantial difference is usually insured by the fact that the extracted hydrocarbons are relatively more polar in character than those remaining behind as raffinate, but in addition this natural difference may be very favorably accentuated by the choice of a solvent the dielectric constant of which is considerably greater than that of the oil. In general I prefer to employ solvents the dielectric constants of which are more than twice the dielectric constant of the oil being treated. The relatively greater concentration of solvent in the extract phase then insures that the dielectric constant of the extract phase is substantially higher than that of the raffinate phase, whereby coalescing forces of substantial magnitude are set up during electric treatment. Where possible, it is usualy advantageous to maintain the raffinate phase having the relatively low dielectric constant as the effective external phase, whereby the mutual contact and coalescence of the dispersed extract droplets in the regions of concentrated field strength is facilitated.

While I have chosen to illustrate my invention by special reference to solvent refining of lubricating oils, many other advantageous applications will be apparent to one skilled in the art. Oils of various kinds, such as mineral oils, may be successfully treated, provided they are sufficiently resistant to electric conduction to permit maintenance of the desired gradient. The dispersions treated by my process will in general comprise conjugate phases formed by commingling the oil with a liquid partially miscible therewith, such liquids including, but not being limited to, the selective solvents herein mentioned. Such solvents will preferably be substantially non-aqueous, will have high resistivity and dielectric strength, and will have dielectric constants differing from those of the oils by a factor of two or more. The chemical character of the solvent will be determined by the nature of the constituents which it is desired to extract. For example, the above-mentioned selective solvents are suited for the extraction of aromatic and naphthenic hydrocarbons, while for the extraction of oxygenated constituents, such as phenols and acids, alcohols such as methyl and ethyl alcohol may be used.

It is understood that the details of the above examples are not limiting and that various modifications of my process may be practiced without departing from the scope of the appended claims.

I claim as my invention:

1. An electrical solvent-refining process for the refining of petroleum oils to remove undesirable organic constituents therefrom which are soluble in a selective solvent partially miscible with the oil and which selective solvent when vigorously agitated with the oil tends to form a mixture of conjugate liquid phases which gravitationally separates slowly and difficultly, which process includes the steps of: forming such a mixture of conjugate liquid phases which will separate gravitationally slowly and difficultly by steps comprising bringing together and vigorously agitating said oil and said selective solvent, said selective solvent having a dielectric constant more than twice that of the oil, said mixture comprising droplets of one phase dispersed in the other; establishing a coalescing electric field of sufficient intensity to coalesce the droplets of said one phase dispersed in the other; subjecting a stream of said mixture of conjugate phases to the action of said electric field to coalesce said dispersed droplets; and separating the coalesced droplets from the conjugate phase.

2. An electrical solvent-refining process for the refining of petroleum oils to remove therefrom certain undesirable organic constituents, which process includes the steps of: mixing with the oil a selective solvent comprising an organic liquid partially miscible with the oil and capable of extracting said undesirable organic constituents and having a dielectric constant more than twice that of the oil to form a complex dispersion comprising droplets of the raffinate phase dispersed in the extract phase and droplets of the extract phase dispersed in the raffinate phase; subjecting said complex dispersion to the action of a coalescing electric field; and separating the conjugate phases.

3. An electrical solvent-refining process for the refining of petroleum oils to remove therefrom certain undesirable organic constituents, which process includes the steps of: mixing with the oil a selective organic solvent for said undesirable organic constituents and having a dielectric constant more than twice that of the oil to form liquid extract and raffinate phases having substantially different dielectric constants; partially separating said extract phase from said raffinate phase to provide partially-separated extract and raffinate phases still containing dispersed droplets of the conjugate phase; subjecting one of said partially-separated phases to the action of an electric field to coalesce the dispersed droplets; and separating the coalesced liquid from the conjugate phase.

4. An electrical solvent-refining process for petroleum oils, comprising: forming a dispersion of conjugate liquid phases by steps including bringing together and mixing the oil and a selective solvent for certain organic constituents of said oil, said selective solvent being an organic liquid having a dielectric constant more than twice that of the oil and being sufficiently miscible with the oil to form such conjugate liquid phases preparatory to electric treatment thereof, said conjugate liquid phases comprising extract and raffinate phases having substantially different dielectric constants, one of said conjugate phases being rich in said organic constituents and one of said conjugate phases being dispersed in the form of small droplets in the other of said conjugate phases; subjecting the resulting dispersion to the action of such a high-voltage coalescing electric field to coalesce the small droplets of the dispersed phase and produce separable masses; and separating said masses.

5. An electrical solvent-refining process for petroleum oils, comprising: mixing with the oil a selective solvent for certain organic constituents of said oil, said selective solvent having a dielectric constant more than twice that of the oil and being partially miscible with the oil to form raffinate and extract phases, said mixing being of a character to produce a complex dispersion comprising droplets of the raffinate phase dispersed in the extract phase and droplets of the extract phase dispersed in the raffinate phase; and subjecting said complex dispersion to the action of a coalescing electric field in which the voltage gradient in at least one portion of the field is higher than in another portion of the field whereby the droplets of said raffinate phase are selectively coalesced in one of said portions of said field and the droplets of the extract phase are selectively coalesced in the other portion of said field.

6. An electrical solvent-refining process for petroleum oils containing emulsifying agents tending to stabilize emulsions of the conjugate phases formed when a selective solvent is mixed with the oil, said process including the steps of: commingling said oil with a selective solvent for certain organic constituents of the oil to form a mixture of conjugate phases containing emulsified droplets of one of said conjugate phases dispersed in the other, said selective solvent having a dielectric constant more than twice that of the oil and being partially miscible with the oil; and resolving the mixture by steps including subjection of the mixture to the action of a coalescing electric field of sufficiently high gradient to induce destabilization, mutual contact, and coalescence of the emulsified droplets and including subjection of the electrically-treated constituents to a gravitational separating action to separate the liquids of the conjugate phases.

7. An electrical solvent-refining process for petroleum oils, comprising: commingling the oil with a selective solvent for certain organic constituents of the oil to form a dispersion of conjugate liquid phases, said selective solvent being partially miscible with the oil and having a dielectric constant more than twice that of the oil; separating said conjugate liquid phases to produce a substantially homogeneous liquid phase containing solvent and at least some organic constituents of the oil; treating said substantially homogeneous liquid phase to produce droplets of a second conjugate phase dispersed therein; and recovering said second conjugate phase by subjecting the dispersion to the action of a coalescing electric field to coalesce said droplets of said second conjugate phase into masses of sufficient size to separate gravitationally from the remainder of the dispersion.

8. An electrical solvent-refining process for petroleum oils, comprising: commingling the oil with a selective solvent for certain organic constituents of the oil to form a dispersion of conjugate liquid phases, said selective solvent being partially miscible with the oil and having a dielectric constant at least twice that of the oil; separating said conjugate liquid phases to produce an extract phase containing both intermediate and low-grade oil constituents; cooling said extract phase to cause rejection of the intermediate-grade constituents as a conjugate phase comprising liquid droplets of said intermediate-grade constituents dispersed in the extract phase; subjecting the cooled mixture to the action of a coalescing electric field to coalesce the dispersed conjugate phase thereof; and separating the coalesced conjugate phase.

9. A rapid and efficient process for the separation of raffinate-continuous dispersions containing a dispersed extract phase, which raffinate-continuous dispersions are formed in the solvent refining process when a selective solvent having a dielectric constant more than twice that of a petroleum oil is mixed with such oil, said selective solvent being partially miscible with the oil and being capable of extracting undesired organic constituents from the oil, which process includes the steps of: establishing a high-voltage coalescing electric field of sufficient gradient to rapidly coalesce the dispersed extract phase of said raffinate-continuous dispersion; subjecting said raffinate-continuous dispersion to the action of said electric field to coalesce said extract phase into masses of sufficient size to gravitate rapidly from the oil; and gravitationally separating said coalesced extract phase from the raffinate phase.

10. A rapid and efficient process for the separation of a dispersion of conjugate liquid phases produced in the solvent refining of petroleum oils when employing a selective solvent substantially miscible with the oil and having a dielectric constant more than twice that of the oil, which process includes the steps of: partially separating such dispersion of conjugate liquid phases to form a raffinate-continuous dispersion containing dispersed droplets of the extract phase; subjecting this raffinate-continuous dispersion to the action of a high-voltage coalescing electric field to coalesce the dispersed droplets of the extract phase; and separating the coalesced extract phase from the raffinate phase.

RODERICK B. PERKINS, JR.